United States Patent [19]

Samworth

[11] Patent Number: 5,297,058
[45] Date of Patent: Mar. 22, 1994

[54] METHOD FOR CREATING MULTICOLORED HALFTONE REPRODUCTIONS FROM CONTINUOUS TONE MONOCHROME ORIGINALS

[75] Inventor: Mark R. Samworth, Wilmington, Del.

[73] Assignee: E. I. Du Pont de Nemours and Company, Wilmington, Del.

[21] Appl. No.: 992,406

[22] Filed: Dec. 15, 1992

Related U.S. Application Data

[63] Continuation at PCT/GS91/06/31, Aug. 27, 1991, which is a continuation-in-part of Ser. No. 573,072, Aug. 29, 1990, abandoned.

[51] Int. Cl.$^5$ ................................. G06F 15/20
[52] U.S. Cl. ........................ 364/526; 348/32; 358/456
[58] Field of Search ............ 364/526, 525, 551.01, 364/553; 395/131, 112; 346/153.1; 358/75, 79, 80, 455, 456, 458, 459; 340/701

[56] References Cited

U.S. PATENT DOCUMENTS

| | | | |
|---|---|---|---|
| 2,434,561 | 1/1948 | Hardy et al. | 364/526 |
| 3,647,942 | 3/1972 | Siegel | 358/82 |
| 3,673,317 | 6/1972 | Newell et al. | 358/82 |
| 4,583,186 | 4/1986 | Davis et al. | 364/526 |
| 4,623,972 | 11/1986 | Darby et al. | 364/526 |
| 4,706,206 | 11/1987 | Benoit et al. | 364/526 |
| 4,862,256 | 8/1989 | Markle et al. | 358/81 |
| 5,089,977 | 2/1992 | Pfläster et al. | 395/131 |
| 5,093,717 | 3/1992 | Sandrew | 358/82 |
| 5,168,352 | 12/1992 | Naka et al. | 358/75 |

OTHER PUBLICATIONS

Andrews et al.; "Image Processing by Digital Computer"; IEEE Spectrum, Jul. 1972.
Bauer; "Electronic Converter for Gray Tones into Colours"; Elektronic, May 1975.
Published by E. I. Du Pont de Nemours and Company, "Communicator", Copyright 1990.

*Primary Examiner*—Jack B. Harvey
*Assistant Examiner*—Ellis B. Ramirez

[57] ABSTRACT

A method for generating halftone images from monochrome original images and, more particularly, to a method for reproducing a monochrome original image using at least two different colorants to create an image having a preselected hue and chroma while substantially maintaining the same lightness as in the monochrome original image.

11 Claims, 5 Drawing Sheets

|       |       |       |       | Y1 M9 K2 | Y2 M10 K1 |
|-------|-------|-------|-------|----------|-----------|
|       | Y1 M6 K4 | Y2 M7 K3 | Y3 M8 K2 | Y4 M9 K1 |
| Y1 M3 K6 | Y2 M4 K5 | Y3 M5 K4 | Y4 M6 K3 | Y5 M7 K2 | Y6 M8 K1 |
| Y3 M2 K6 | Y4 M3 K5 | Y5 M4 K4 | Y6 M5 K3 | Y7 M6 K2 | Y8 M7 K1 |
| Y5 M1 K6 | Y6 M2 K5 | Y7 M3 K4 | Y8 M4 K3 | Y9 M5 K2 | Y10 M6 K1 |
|       | Y8 M1 K5 | Y9 M2 K4 | Y10 M3 K3 |       |       |

FIG. 5

METHOD FOR CREATING MULTICOLORED HALFTONE REPRODUCTIONS FROM CONTINUOUS TONE MONOCHROME ORIGINALS

CROSS REFERENCE TO RELATED APPLICATION

This is a continuation application of PCT application PCT/US91/06131 filed Aug. 27, 1991 designating the U.S., which is a continuation-in-part application of U.S. patent application Ser. No. 07/573,072, filed Aug. 29, 1990, now abandoned.

BACKGROUND OF THE INVENTION

1. Field of the Invention

This invention relates to a method for generating halftone images from monochrome original images and, more particularly, to a method for reproducing a monochrome original image using at least two different colorants to create an image having a preselected hue and chroma while substantially maintaining the same lightness as in the monochrome original image.

2. Description of the Prior Art

In monochrome half-tone image reproduction, various shades of gray appearing in a continuous tone original image are reproduced on paper by a single tone ink. To simulate the multiple shades of gray in the original, the continuous tone image is converted into a half-tone image. Half-tone images comprise a plurality of different size dots of a uniform optical density level. The human eye integrates the dots with the background and is fooled into believing that it sees a multiplicity of continuous tone gray shades, the apparent gray level being a function of the size of the dots per unit area.

Recently, computer implemented methods have been developed, which apply algorithms to digital image data representing a continuous tone image to generate information which correlates the original image optical density values to percent dot area coverage in a halftone system needed to reproduce the original density range, preferably while taking into account the limitations in the optical density reproduction range inherent in a particular reproduction system. There are a number of algorithms available for generating half-tones from continuous tone data; U.S. Pat. No. 4,654,721 issued to Goertzel et al. and U.S. Pat. No. 4,667,250 issued to Murai, provide good examples of this technology. The result of these methods may be viewed as a transfer function which is applied to convert input data representing an original continuous tone image optical density to output data representing a percent dot area in the half tone reproduction.

In most applications the generated data is used to drive a recorder which exposes a photosensitive film creating dots sized in accordance with the data. The film after development is used to expose a lithographic plate which is then used on a press to apply a colorant, i.e., a colored ink, usually black in cases of monochromatic reproduction, to reproduce the original image.

The reproduction of full color images, which attempt to faithfully reproduce the color gamut of an original colored image using halftone technology is also well known in the art. Such technology involves a plurality, usually four, of overlapping images printed in juxtaposition, each with a different colorant. Each of those images is a halftone representation of the original representing the original as viewed through a color separation filter. Specific filters and colorants have been developed, and are well known in the art. Typically these filters are red, green and blue, while the colorants used are cyan, magenta, yellow and black. Maintaining color fidelity (i.e., hue, chroma and lightness using the terminology typically used to describe color perception space) from original to reproduction has been the subject of numerous inventions and scientific disclosures. See in general by Michael H. Bruno, published by GAMA Communications, Salem, N.H., 1986 edition, for a good discussion of some of the problems and solutions to faithful color reproduction in the printing industry.

In addition to images reproducing or at least attempting to reproduce the full color gamut of an original multicolored image in halftone, there is another form of color reproduction, in which more than one colorant is used in the reproduction of an image, but where the original image is a monochromatic image, and no attempt is made to generate an image having the appearance of a multicolored image as would be created using the color separation process briefly described above, i.e., an image with a multiplicity of hues and chroma. In this process, the reproduced image has a single hue and chroma but the lightness has been preserved substantially the same as that of the original image.

This type of image reproduction is known in the printing trade as "duotone", "tritone", "quadratone", etc., depending on the number of colorants used. A problem encountered when attempting to make "duotones", "tritones", etc., is that the percent dot areas covered by the colorants cannot be simply added numerically to duplicate the original monochromatic image while maintaining hue, chroma, and lightness. Assume for example that a desirable transfer function has been established which acceptably reproduces in half tone, an original black and white image density range. This density range is the lightness of this image. For each lightness value there is a corresponding percent dot area that will be printed, based on this transfer function. Further assume that we desire to create from the same original monochromatic, black and white image an image having a selected hue and chroma resulting from a combination of two colorants, e.g., a cyan and a black ink, so that the reproduced image has a bluish tint and that we want the bluish tint to be about 10. This means that the reproduction will be created using a combination of two images, a cyan and a black printed one on top of the other in superposition. If we want to maintain the same lightness overall as in the original, each lightness value in the original must be divided into two components one for the cyan image and one for the black. However, if we want to introduce 10% blue in the image, we cannot simply calculate for each original lightness value, a cyan ink dot area equal to 10% of the dot area called for by the monochrome transfer function, and for the black ink 90% of that same dot area. The results after superposition do not reproduce an image with the same lightness as the original.

At present, particularly in the Graphic Arts, there is a need for predictably generating duotones, tritones, quadtones, etc., from monochromatic originals. More particularly, there is need for a method whereby given an original monochrome image, and a particular transfer function selected to reproduce this image in halftone with tone values, that is, lightness, which are desirable, one may readily derive new transfer functions for preselected colorants such that images generated for each colorant using the derived new transfer functions for each colorant will produce an image when combined in superposition as by printing, which image will have a preselected hue and chroma, and in which the tonal range, i.e., lightness, will be the same or substantially the same as in an image produced using the transfer function selected for the original monochromatic reproduction.

SUMMARY OF THE INVENTION

This invention relates to a method for producing an output image from an input monochrome image having a Lightness, the output image having a preselected chroma, a preselected hue and a lightness equal to or substantially equal to a desired lightness, comprising:

(a) selecting a first transfer function correlating lightness values (Do) of the input image to percent dot areas (%Dt) of the output image such that use of the first transfer function produces a first single colorant image having the desired lightness;

(b) selecting a sample image from a set of sample images, each of the sample images having a chroma, a hue and a lightness, the lightness being the same or substantially the same in each of the sample images, each of the sample images generated using a combination of at least two colorants;

(c) establishing a colorant transfer function for each of the colorants such that use of each of the colorant transfer functions produces a single colorant output image such that the output image comprises the combination of all of the single colorant output images generated from the colorant transfer functions where the output image has a lightness equal to or substantially equal to the lightness of the first single colorant image generated using the first transfer function and the same or substantially the same hue and chroma of the selected sample image, wherein the colorant transfer functions are established using an equation where $A_C$ is a function of A and $W_C$ and is independent of grey level ($D_o$) where:

$A_C$ is a percent dot area for a given lightness value corresponding to the colorant transfer function for a colorant, A is a percent dot area for the same lightness value calculated based on the first transfer function, and $W_C$ is a color weight factor derived for each of the colorants for each of the sample images; and (d) using the colorant transfer functions to generate the output image.

Preferably, the colorants are printing inks, and include black in combination with either one or more of cyan, magenta or yellow. Associated with each of the sample images is a table or chart, the table or chart identifying each of the colorant transfer functions for the colorants used in the sample images.

The colorant transfer functions are established using the following empirically derived equation:

$$A_C = A + [(W_C - 8) \times (0.00055675 \times A^{1.30099} \times (100 - A)^{0.5730}) \times 6].$$

DETAILED DESCRIPTION OF THE INVENTION

The invention is best described with reference to the figures in which similar numbers depict similar items. The figures are illustrative for the purpose of facilitating the description of the present invention, and are not to be viewed as limiting.

In dealing with color, and particularly with perception of color, there is great confusion in the use of terms which though often inaccurate have been adopted by certain industry segments to describe and measure image appearance. In an effort to avoid confusion, the following terms are used in describing this invention.

(a) Brightness: an attribute of visual sensation according to which an area appears to exhibit more or less light.

(b) Lightness: a colorimetric term used to describe the relative Brightness of an area to the Brightness of a similarly illuminated area that appears white or highly transmitting. For purposes of describing the present invention, we will use as a measure of lightness the neutral (gray) density measurement from an image as obtained with a Macbeth densitometer. Lightness is at times described in the Graphic Arts enbironment and can be defined for the purposes of this invention as the gradation, or the optical density spread of an image.

(c) Chroma: the degree of saturation of a color.

(d) Hue: what is commonly referred to as a color, i.e., blue, green, yellow, etc.

Figure 1:
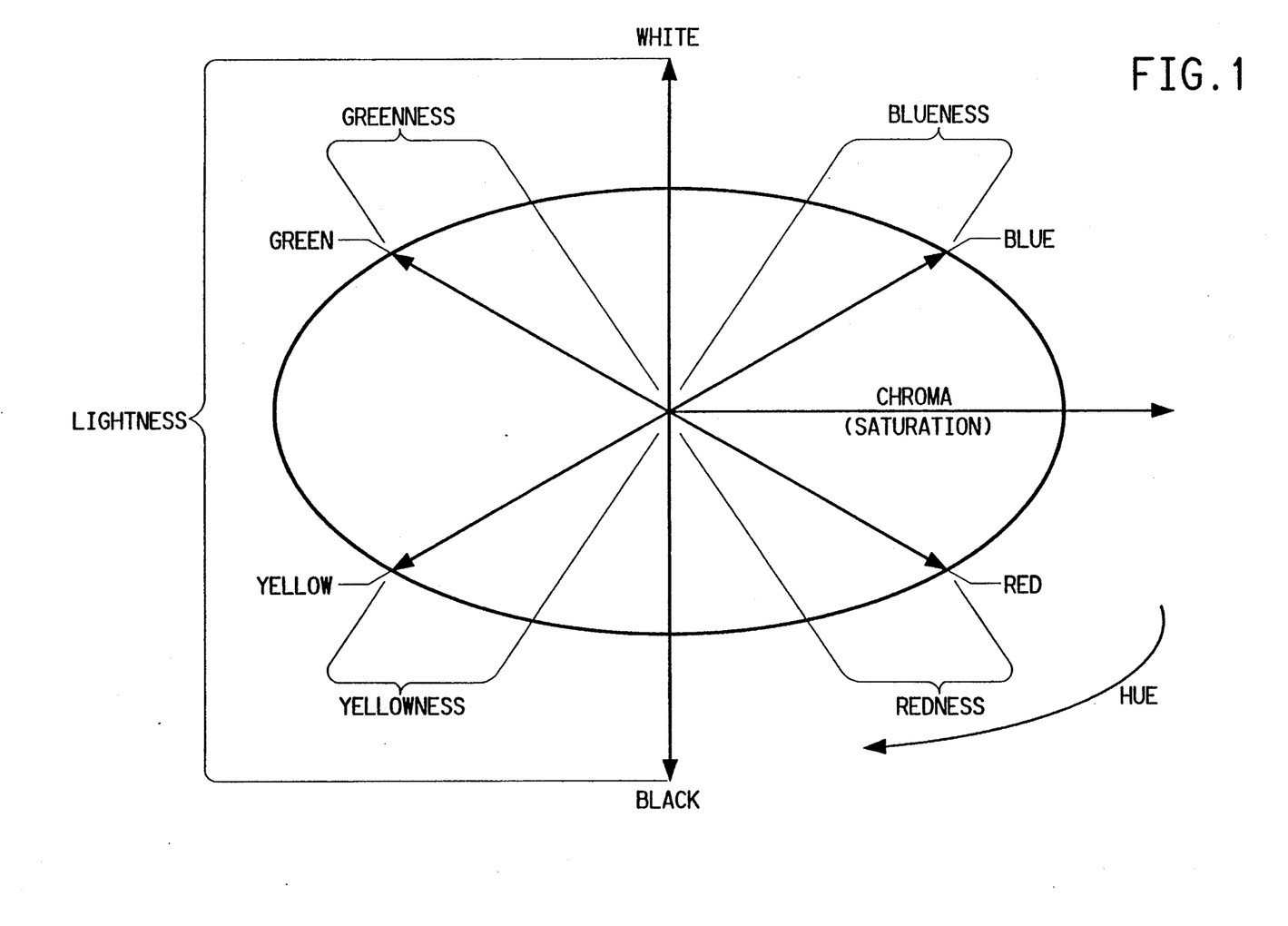
FIG. 1 is a geometrical model representing color-perception space.

FIG. 1 shows a typical three dimensional model representing color-perception space. FIG. 1 illustrates the relationship between the terms lightness, chroma, and hue. Additional information regarding color space may be found in "Measuring Colour" by R. W. G Hunt, Applied Science and Industrial Technology series, published by Ellis Horwood Limited and particularly Chapter 4.

Figure 2:
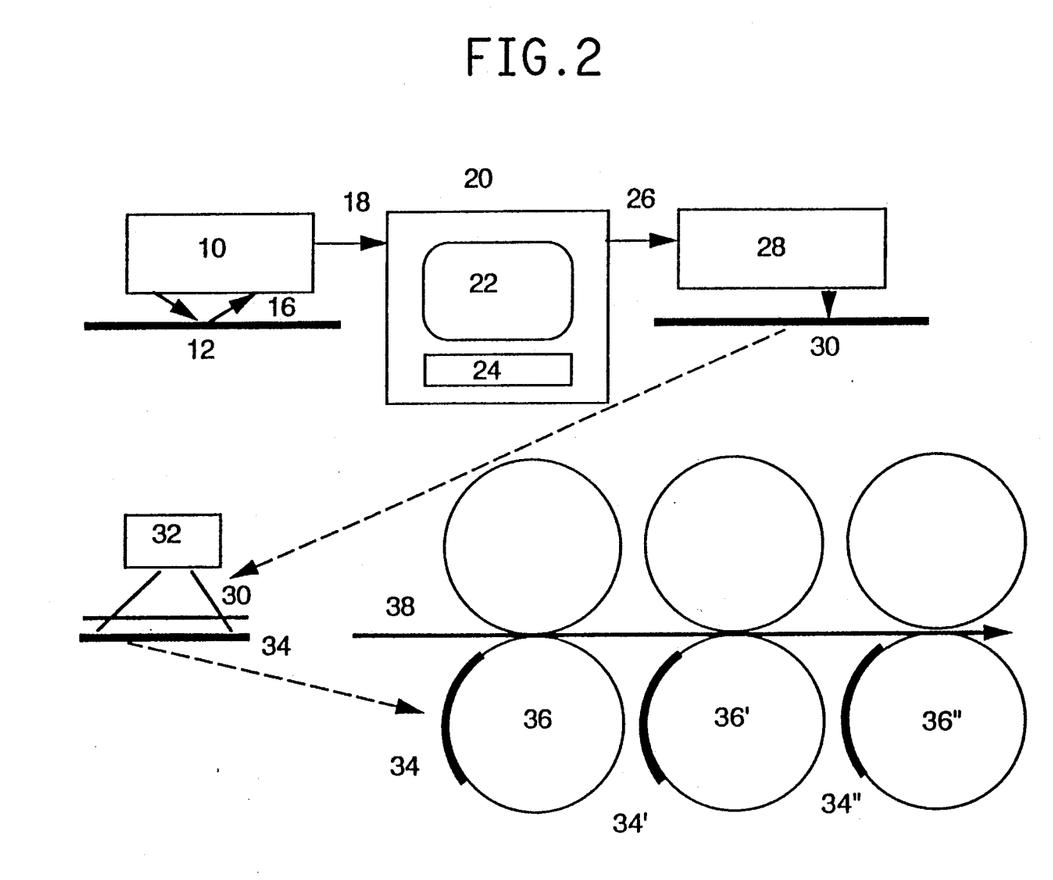
FIG. 2 is a schematic representation of a system for implementing the method described in the present invention.

Referring now to FIG. 2, there is depicted in schematic format a printing arrangement useful in explaining an implementation of the present invention. Such arrangement may comprise a scanner/digitzer 10 which is used to read an original image 12 typically by directing and scanning a light beam 14 onto the image and detecting the reflected (or transmitted) beam 16 from the image. The scanner is further able to digitize the detected beam 16 output. In an 8 bit digital system, the digitized image will have discreet values ranging from 0 to 255 for each of the picture elements into which the image is broken down to, the pixel size being a function of the resolution abilities of the scanner/digitizer 10. This range of digital values corresponds to the lightness of the original image. We will use the same numerical values for lightness as for density range since both are dimensionless quantities and represent a ratio.

The digitizer output is directed over line 18 to a digital signal processor unit 20, which may include a CPU and the appropriate software to process the image data prior to sending it over line 26 to a recorder 28. The CPU may perform a number of functions in addition to processing image data in accordance with the present invention. It may include keyboard means 24 to allow an operator to input instruction or additional information, and may include display means 22 to facilitate the communication process between the operator and the CPU.

The output of recorder 28 is a half-tone film transparency 30. The half-tone transparency is used in an exposure unit 32 to expose a lithographic printing plate 34. Following exposure, the plate 34 is developed in equipment not shown herein, then mounted on a printing apparatus 36 where it is used to print a reproduction of the original image onto a receiving medium 38. In the present invention, the recorder 28 will generate a number of half tone transparencies the number being commensurate with the desired number of colorants to be used for the production of the reproduced image. For a "duotone" image, two transparencies will be generated, and two printing plates will be made therefrom. For "tritone" image reproduction, three, and so forth. In printing, the press arrangement includes multiple stations 36, 36', 36", etc. on which the plates 34, 34', 34", etc., are mounted, and through which the receiving medium 38 is transported sequentially. A different colorant image is printed on the medium as it passes through each station in substantial superposition, resulting in a multicolored image.

The first set of operations on the data from the scanner digitizer 10, is limited to modifying the original data in a manner such that a print reproduced on a user specified set up will be reproduced so that the relative relationship between the lightness in the original is the same as in the print or differs therefrom in a desired manner.

What is meant by "is the same" in the above sentence is that if the original image has a maximum lightness value of 2.0 and a minimum of 0.2, as measured by a densitometer set for gray scale measurement, and the printing system used can only produce a minimum lightness (i.e., solid ink area) of 1.6 and a maximum lightness, (i.e., no ink area) of 0.1, again as measured by a densitometer similarly set, then any lightness value in the original continuous tone image measured as a reflected density and normalized as a percentage of the total reflected density range in that image, will be reproduced in the print with a half-tone dot area whose apparent optical density is the same percentage of the full print density range as in the original image, i.e., the same normalized lightness. For instance, if an area has an optical density of 0.6 in the original, that is the area is (0.6/1.8)*100 or 33.33% of the spread of the original density, then the same area will be reproduced in the print with an apparent density of 33.33% of the printed density spread, or 0.3333*1.5=0.499.

On the other hand, by the phrase "differs in a desired manner", it is meant that the lightness reproduction between original and reproduction will not necessarily maintain the above relationship, but may have any arbitrary relationship selected as "desirable".

In either case, there exists a transfer function, herein referred to as the first transfer function which when used in monochromatic reproduction of a continuous tone original will generate a reproduction which is what is desired. This function may reside in a computer memory as a look up table of coefficients, or an equation, and is used to convert Lightness values for every pixel in the original to percent dot areas which are transmitted to the recorder 28 to generate the transparency from which a printing plate will eventually be produced.

In some applications the recorder may produce a printing plate directly, omitting the intermediate step of producing a transparency. However this invention is equally applicable to whether a half-tone transparency or a printing plate are produced in the recorder.

Co-pending application U.S. Ser. No. 07/726,461, filed on Jul. 8, 1991, in the name of Mark Richard Samworth and assigned to the same assignee as the present invention, discloses a method describing in detail a process for selecting a first transfer function which may be used in practicing this invention. While the particular method for arriving at such a first transfer function is not critical to the practice of the present invention, the process described in the aforementioned application is preferred because of the predictability of monochromatic reproduction offered when the first transfer function derivation is done in accordance therewith. The contents of this co-pending application are expressly incorporated by reference herein.

In addition to the first transfer function, there is needed for the practice of this invention a set of sample images and corresponding derived colorant transfer functions.

The set of sample images comprises printed halftone images printed using two or more colorants. Preferably, there is a set of sample images for combinations of different amounts of black colorant and yellow, or black and cyan, or black and magenta, using the most commonly available printing ink colorants. Similarly, there is preferably another set of sample images printed using various combinations of three colorants, again black and yellow and cyan, or black and magenta and cyan, or black and magenta and yellow, and a set of printed images printed using a combination of four colorants, i.e., black, yellow, magenta, and cyan, in various proportions.

The printed images all represent the same scene and all are a reproduction of an original monochromatic image preferably a black and white continuous tone photograph. All sample images have the same lightness but each has a different hue and chroma. A set of sample images useful in practicing this invention may be obtained through the E. I. du Pont de Nemours and Company with offices in Wilmington, Del., in a publication called the "Spectratone Communicator".

Figure 3:
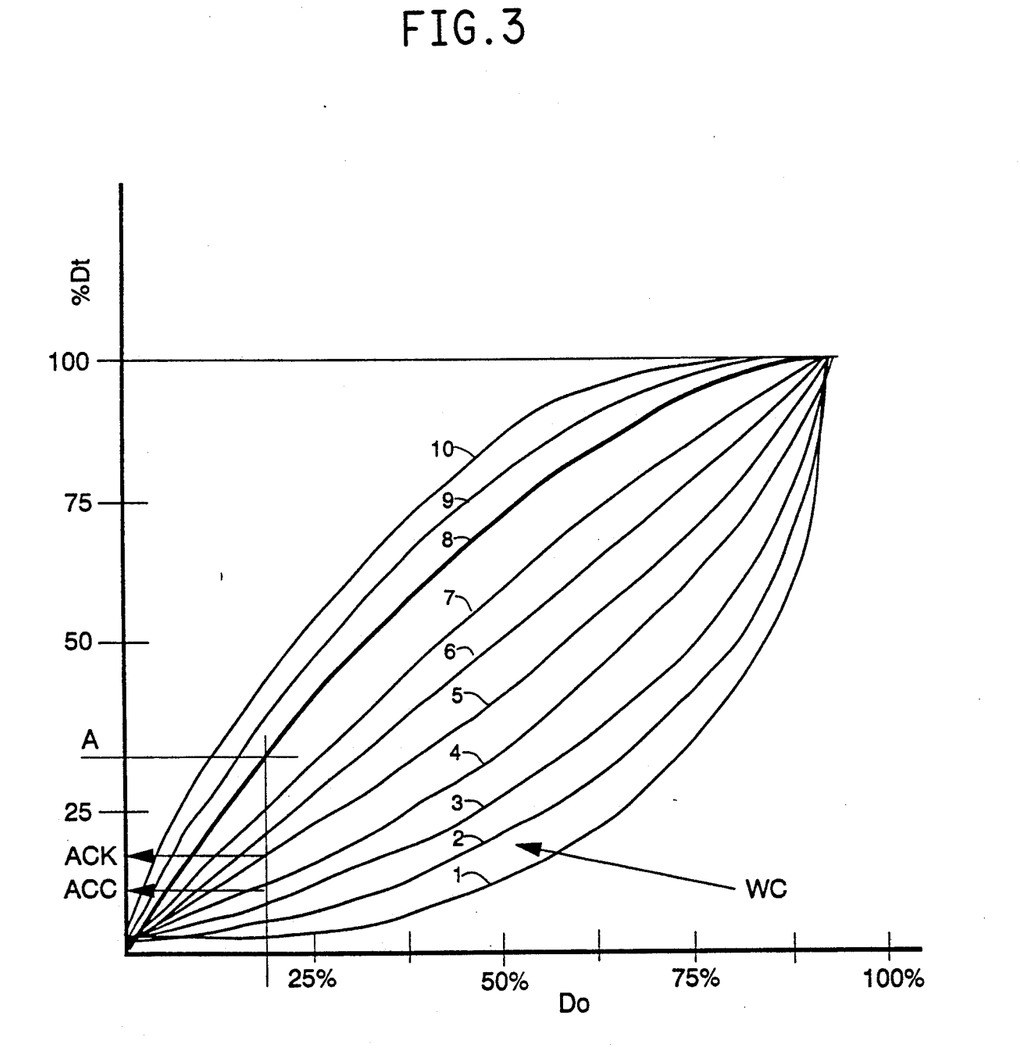
FIG. 3 is a plot of a family of curves representing a first transfer function and a plurality of colorant transfer functions derived from the first transfer function.

In constructing the set of sample images, the first transfer curve is selected, preferably one that for a particular set of printing conditions will reproduce after printing with black colorant ink only, an image which has substantially the same lightness as the original continuous tone image. Such first transfer function may be derived as explained before using the method disclosed in the aforementioned application U.S. Ser. No. 07/726,461. Such a function or curve is schematically represented in FIG. 3 as a heavy line, numbered for reasons to be discussed herein below as curve No. 8. The values shown in FIG. 3 for the two axes are illustrative only.

After selecting the first transfer function, the original image is reproduced through printing using two colorants, i.e., black and cyan inks. The relationship between the original image lightness and the percent dot area output for various lightness values for each of the two colorants is adjusted through trial and error until a printed image is printed, which when photographed using black and white film, produced a photograph that was substantially indistinguishable from a photograph under the same lighting conditions and with the same camera, film, and development of the image printed using the first transfer function and a black ink colorant only. The two colorant transfer functions are identified and plotted.

The process is repeated a number of times, using different amounts of colorant percent dot areas to provide images having different chroma and with different colorants to provide images having different hue. In all instances the resulting colorant transfer functions, which when combined gave images having the same lightness as the monochromatic image produced using the first transfer function, were recorded.

In developing a set of sample images, a family of curves, similar to the family of curves shown in FIG. 3 is generated. Lightness is maintained when particular combinations of the transfer functions represented by these curves are used, and when those combinations are used, the hue and chroma in the printed image remains constant for all lightness values within an image. Furthermore, the same curves are applicable for all colorants.

Figure 4:
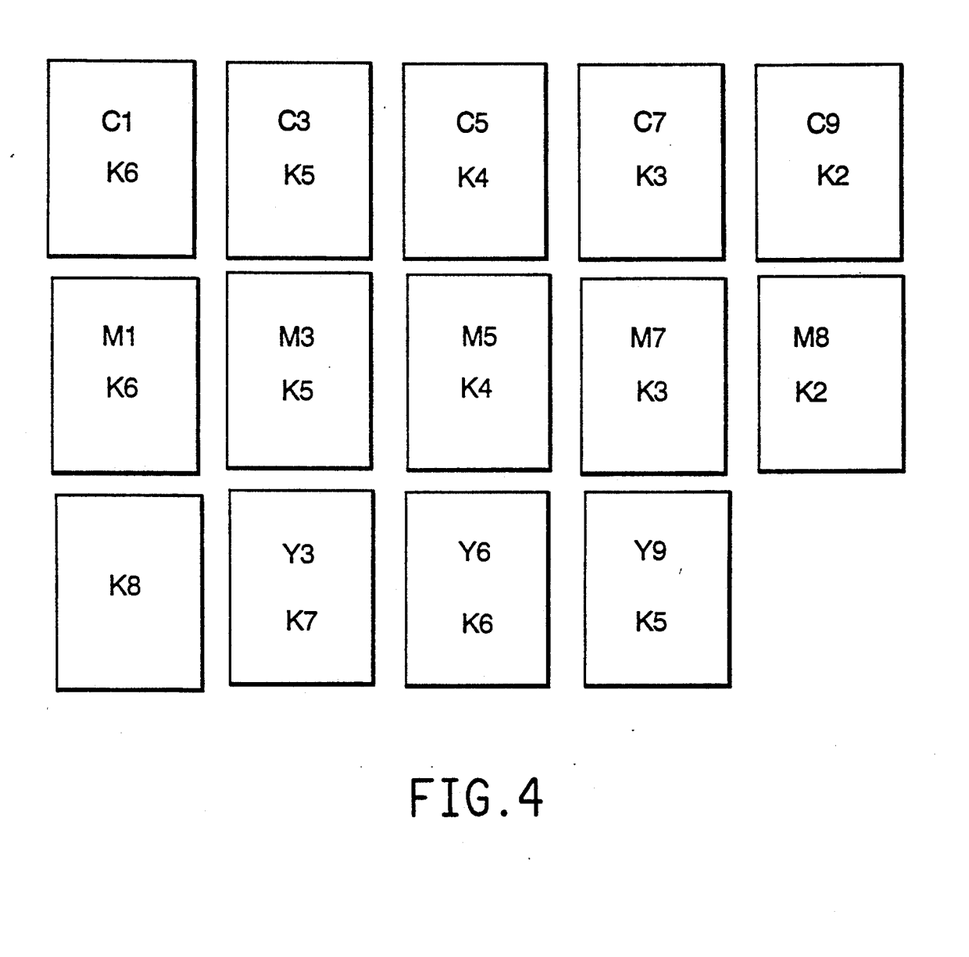
FIG. 4 is a table of colorant transfer function weight factors corresponding to a particular set of duotone sample images.
Figure 5:
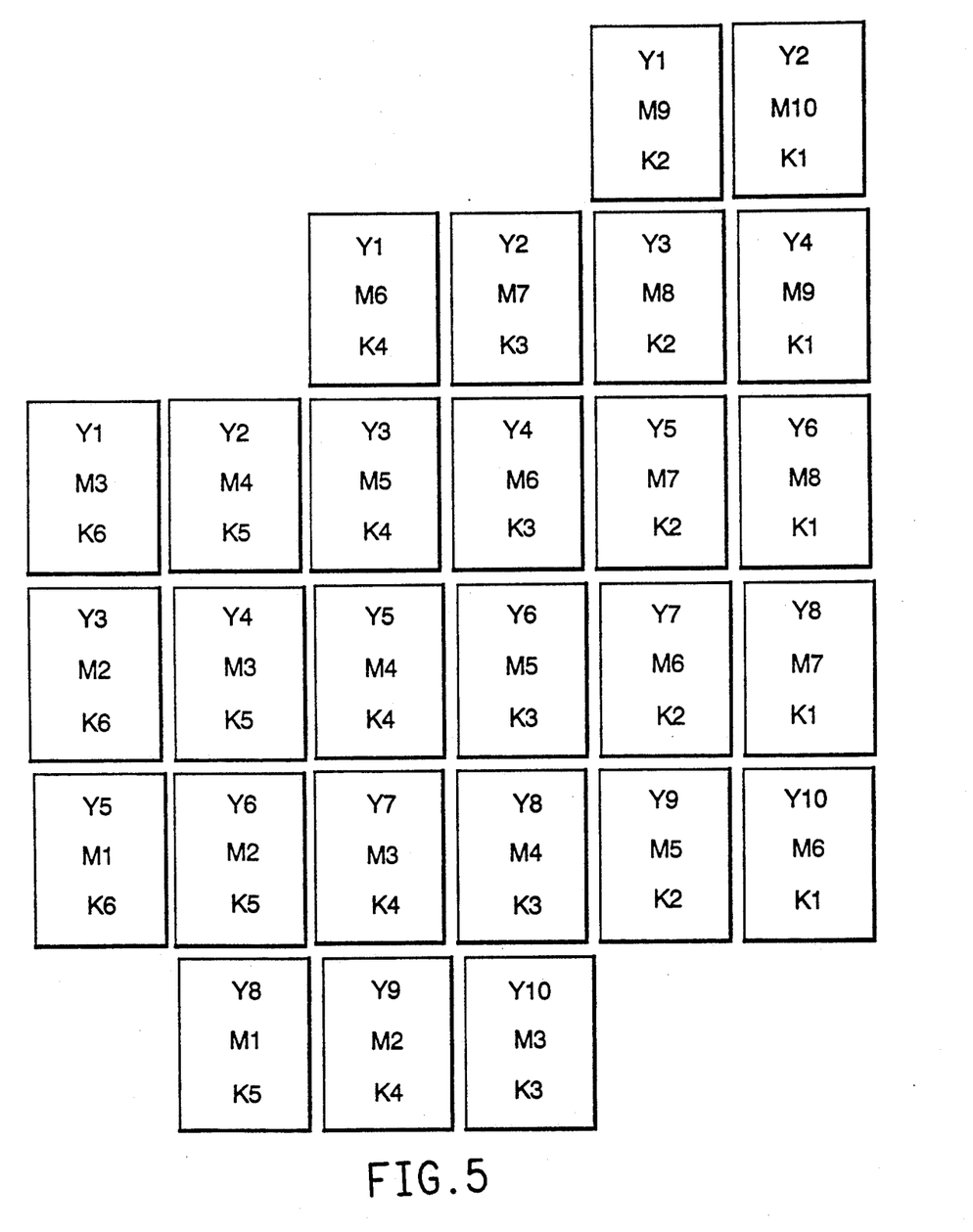
FIG. 5 is a table of colorant transfer function weight factors corresponding to a particular set of tritone sample images.

To provide a practical guide to the practitioner of this invention, a finite number of sample images having different hue and chroma each are printed, and a table identifying the corresponding colorant transfer curves is generated recording for each sample image in the set the colorant transfer curves combination to be used to develop halftone film transparencies to make plates to print an image having a selected hue and chroma. FIGS. 4 and 5 show typical such tables which correspond to a set of sample images for a "duotone" and a "tritone" reproduction, respectively. The particular table arrangement corresponds to the layout of figures shown in the aforementioned "Spectratone Communicator" publication, for "process duotones" and "magenta yellow tritone". The squares represent the printed image location in the guide, and the numbers within each square identify the colorant transfer functions used in producing the image.

Further study of the data resulted in the derivation of an empirical relationship which can be used in a computer environment with an adequate degree of accuracy to determine a new percent dot area to be used for each colorant, for each lightness value, to replace the percent dot area that would have resulted if the first transfer function was used in a monochromatic reproduction, such that lightness may be maintained for any desired hue and chroma.

Thus, referring to FIG. 3, if A represents a percent dot area (% Dt) called for to reproduce a lightness value (i.e., 20%) of the original image using a first transfer function (here curve No. 8) selected such that the reproduction is satisfactory, then for the same lightness value (Do) for each of the colorants desired to be used to obtain a desired hue, a new percent dot area $A_C$ is calculated corresponding to the percent dot that would be called for, using the appropriate transfer function, i.e., curve No. 6, and given by:

$$A_C = A + [(W_C - 8) \times (0.00055675 \times A^{1.30099} \times (10 - 0 - A)^{0.5780}) \times 6] \quad (1)$$

A factor $W_C$ used to modify the relationship for each colorant transfer function to be used in particular combination, is an arbitrary constant which is associated with each of the colorant transfer functions as shown in FIG. 3. Since the colorant transfer functions lie on both sides of the first transfer function, it was elected to develop a color weight scale identifying and characterizing each of the colorant transfer functions that will not include positive and negative values as would be the case if the first transfer function was used as the base line.

The color weight scale was further selected such that a reasonable range of hue and chroma values could be represented extending from combinations of almost zero amounts of one colorant to almost full printing with the same colorant while maintaining the maximum density range printable with the particular combination of colorants. If the lightness of the original is to be maintained, there is a reciprocal relationship between the relative weights of the colorants used, and the selected weight factor relationship shows this. In the case of duotones, the sum of the weights associated with the colorant transfer functions to be used to produce an image maintaining the original lightness for any hue or gradation for particular colorant combinations is given by:

$$Wcc + 2Wck = 13 \quad (2)$$

where Wcc represents the weight of a cyan colorant, and Wck represents the weight of a black colorant, $$Wcm + 2Wck = 13 \quad (3)$$

where Wcm represents the weight of a magenta colorant, and $$Wcy + 3Wck = 24 \quad (4)$$

where Wcy represents the weight of a yellow colorant.

When more than two colors are used, the relationship becomes more complex, since there are more than two variable and more than one need to be fixed to determine the other. For tritones using magenta, cyan yellow and black combinations, $$Wcc + Wcm + 2Wck = 12, \quad (5)$$

$$Wcy + 2Wcc + 3Wck = 25, \text{ and} \quad (6)$$

$$Wcy + 2Wcm + 3Wck = 25. \quad (7)$$

If two colors are used, as for a Duotone, for a given hue and chroma, there are two corresponding colorant transfer curves that will reproduce an image maintaining Lightness as would be using the first transfer curve alone. From the chart associated with the selected sample image, two values for W, Wcc and Wck are obtained. These values are used in equation (1) to produce, for each percent dot area A, corresponding to the percent dot area called for by the first transfer curve to reproduce a desired lightness, an Acc and Ack. For example, if the two colorant transfer functions are Wcc=3 and Wck=5, and for a given lightness value and a first transfer function 8, A=30%, then Acc=13.75% and Ack=20.25%, the sum of which is not A, but which if printed together produce the same Lightness as A.

The availability of computers allows one to forego the actual step of constructing the curves represented in FIG. 3. Either a look up table may be used providing coefficients which can be used to calculate $A_C$ values from A or the relationship given above for calculating $A_C$ from A for each lightness value for each pixel may be used. For purposes of the present invention, the use of either a look up table or a calculation is the same as using a transfer function.

Whether done in a computer by calculation or by construction of curves such as shown in FIG. 3, an image is created and printed by following the following steps.

A first transfer function "8" is selected and the family of colorant transfer functions corresponding to the first function are constructed using the relationship between A and $A_C$. Then from the set of sample images, one is selected which has the desired appearance. The colorant transfer function combination is noted from the table associated with the set of sample images. Using the example of a duotone image having a particular hue and consisting of the combination of a black ink and a cyan ink, with corresponding colorant transfer functions identified from the table of FIG. 4 as "6" for black (K) and "7" for cyan (C), two halftone separation transparencies are produced by the recorder 28 which are then used to print two superposed images using the black and cyan colorants.

In practice, there is no need of course to produce the whole family of curves for the colorant transfer functions, but it is sufficient to only produce the two curves called for by the selected sample image, i.e., the two curves identified as No. 6 and No. 7. Furthermore, it is most likely that equation (1) will be used to derive values for $A_C$ for each lightness input value for each pixel, without ever physically constructing any of the curves depicted in FIG. 3.

As presently implemented and described, the invention uses a printed set of sample images. However, it is possible to store simulations of the printed sample images in a computer memory and display the simulated printed samples on a screen for selection. Also, the associated table which identifies the colorant transfer function in terms of its weight factor number, need not be a separate table, but may also be incorporated in a computer accessible memory and accessed directly once a displayed image is selected; or if the image is selected from a printed display, a simple identification number may be provided correlating the colorant transfer function weight stored in a computer accessible memory to the printed image, without need for an operator to manually select the appropriate coefficients $W_C$. While the set of sample images discussed herein is preferably depicting an actual scene, plain color scales of various chroma and hue may be substituted.

The invention has heretofore been described in terms of traditional printing technology, however, it is equally applicable to non traditional technologies, such as applications involving creation of quasihalftone images, images created using sublimable dies, images produced on CRTs, etc. These and other variations may be practiced by the skilled artisan and still be within the scope of the invention.

What is claimed is:

1. A method for producing a multi-colorant output image from an input monochrome image having a lightness, the multi-colorant output image having a preselected chroma, a preselected hue and a desired lightness comprising:

(a) selecting a first transfer function correlating optical density values (Do) of the monochrome input image to percent dot areas (% Dt) of the multi-colorant output image such that use of the first transfer function produces a first single colorant image having the desired Lightness;

(b) selecting a sample image from a set of sample images, each of the sample images having a chroma, a hue and a lightness, the lightness being the same or substantially the same in each of the sample images, each of the sample images generated using a combination of at least two colorants;

(c) establishing a colorant transfer function for each of the colorants such that use of each of the colorant transfer functions produces a single colorant output image such that the multi-colorant output image comprises the combination of all of the single colorant output images generated from the colorant transfer functions where the multi-colorant output image has a lightness equal to or substantially equal to the lightness of the first single colorant image generated using the first transfer function and the same or substantially the same hue and chroma of the selected sample image, wherein the colorant transfer functions are established using an equation where $A_C$ is a function of A and $W_C$ and is independent of gray level ($D_o$) where:

$A_c$ is a percent dot area for a given lightness value corresponding to the colorant transfer function for a colorant, A is a percent dot area for the same lightness value calculated based on the first transfer function, and $W_c$ is a color weight factor derived for each of the colorants for each of the sample images; and (d) using the colorant transfer functions to generate the multi-colorant output image.

2. The method of claim 1, wherein the colorants include black.

3. The method of claim 1, wherein there are 2, 3 or 4 colorants.

4. The method of claim 1, further comprising associating a table or chart with each of the sample images, the table or chart identifying each of the colorant transfer functions for the colorants used in the sample images.

5. The method of claim 1, wherein the colorant transfer functions are established using the equation:

$$A_C = A + [(W_C - 8) \times (0.00055675 \times A^{1.30099} \times (10 - 0 - A)^{0.5780}) \times 6].$$

6. The method of claim 1, wherein the colorants are printing inks.

7. The method of claim 1, wherein the sample images and the output image are halftone images.

8. The method of claim 1, wherein the desired lightness is substantially the same as the original image lightness.

9. The method of claim 1, further comprising using a computer to calculate the first transfer function.

10. The method of claim 5, wherein the color weight factor W of the colorants in a duotone image is related by:

$$Wcc + 2Wck = 13$$

where Wcc represents the weight of a cyan colorant, and Wck represents the weight of a black colorant, $$Wcm + 2Wck = 13$$

where Wcm represents the weight of a magenta colorant, and $$Wcy + 3Wck = 24$$

where Wcy represents the weight of a yellow colorant.

11. The method of claim 5, wherein the color weight factor W of the colorants in a tritone image is related by:

$$Wcc + Wcm + 2Wck = 12,$$

$$Wcy + 2Wcc + 3Wck = 25, \text{ and}$$

$$Wcy + 2Wcm + 3Wck = 25,$$

where Wcc represents the weight of a cyan colorant, Wck represents the weight of a black colorant, Wcm represents the weight of a magenta colorant, and Wcy represents the weight of a yellow colorant.

* * * * *